United States Patent
Rietschel

(10) Patent No.: US 10,671,819 B2
(45) Date of Patent: Jun. 2, 2020

(54) MULTIPURPOSE DETECTION UNIT

(71) Applicant: Qibixx AG, Buchs (CH)

(72) Inventor: Johannes Rietschel, Dübendorf (CH)

(73) Assignee: Qibixx AG, Buchs (CH)

( * ) Notice: Subject to any disclaimer, the term of this patent is extended or adjusted under 35 U.S.C. 154(b) by 23 days.

(21) Appl. No.: 16/302,984

(22) PCT Filed: May 18, 2017

(86) PCT No.: PCT/EP2017/061934
§ 371 (c)(1),
(2) Date: Nov. 19, 2018

(87) PCT Pub. No.: WO2017/198754
PCT Pub. Date: Nov. 23, 2017

(65) Prior Publication Data
US 2019/0294830 A1 Sep. 26, 2019

(30) Foreign Application Priority Data

May 20, 2016 (EP) .................................... 16170572

(51) Int. Cl.
*G06K 7/08* (2006.01)
*G06K 7/10* (2006.01)
(Continued)

(52) U.S. Cl.
CPC .......... *G06K 7/081* (2013.01); *G06K 7/1098* (2013.01); *G06K 7/10702* (2013.01); *G07F 7/12* (2013.01);
(Continued)

(58) Field of Classification Search
None
See application file for complete search history.

(56) References Cited

U.S. PATENT DOCUMENTS 5,187,354 A * 2/1993 Bengtsson ......... G06K 7/10881
235/462.45
5,594,228 A * 1/1997 Swartz ..................... G06K 7/10
235/383

(Continued)

FOREIGN PATENT DOCUMENTS

| EP | 0 991 028 A2 | 4/2000 |
| EP | 1 830 324 A2 | 9/2007 |
| EP | 2 051 186 A1 | 4/2009 |

OTHER PUBLICATIONS

International Search Report for PCT/EP2017/061934 dated Aug. 16, 2017 (PCT/ISA/210).

(Continued)

*Primary Examiner* — Christle I Marshall
(74) *Attorney, Agent, or Firm* — Sughrue Mion, PLLC

(57) ABSTRACT

A device (1, 33) for readout of and/or communication with a consumer carried token is proposed comprising a first area (5) for wireless radiofrequency detection and/or communication; and a second area (6) spatially separated from said first area for a wireless optical detection and/or communication; wherein said first area (5) is located above said second area (6). Said second area (6) comprises a cavity with at least a front opening (53) for inserting said token by a user, bordered by at least a bottom surface (7), a backside wall (41), and a top illumination unit (54), wherein said top illumination unit (54) comprises at least one essentially vertical translucent skirt (8) with its free edge (55) pointing towards the second area (6); as well as an opening (9). Behind and/or below said first area (5) a scanning light source as well as scanning camera is located, both aiming in an upward direction, and above said scanning light source as well as scanning camera a mirror (20) is mounted, for at the same time deflecting the scanning light beam (21) and directing it (22) into said second area (6) onto said bottom (Continued)

surface (7) through said opening (9) in an essentially vertical direction.

24 Claims, 8 Drawing Sheets

(51) Int. Cl.
*G07F 7/12* (2006.01)
*G07G 1/00* (2006.01)
(52) U.S. Cl.
CPC ... *G06K 2007/10485* (2013.01); *G07G 1/009* (2013.01)

(56) References Cited

U.S. PATENT DOCUMENTS

| | | | | |
|---|---|---|---|---|
| 5,918,211 | A | 6/1999 | Sloane | |
| 6,595,421 | B2 * | 7/2003 | Detwiler | G06K 7/10544 |
| | | | | 235/383 |
| 6,854,647 | B2 * | 2/2005 | Collins, Jr. | A47F 9/046 |
| | | | | 235/383 |
| 7,850,085 | B2 * | 12/2010 | Claessen | G06K 7/0004 |
| | | | | 235/462.13 |
| 8,140,395 | B2 * | 3/2012 | Murphy | G06Q 10/087 |
| | | | | 177/116 |
| 2003/0201319 | A1 * | 10/2003 | Patel | G06K 7/10861 |
| | | | | 235/383 |

OTHER PUBLICATIONS

Written Opinion of the International Searching Authority for PCT/EP2017/061934 dated, Aug. 16, 2017 (PCT/ISA/237).

* cited by examiner

MULTIPURPOSE DETECTION UNIT

CROSS REFERENCE TO RELATED APPLICATIONS

This application is a National Stage of International Application No. PCT/EP2017/061934 filed May 18, 2017, claiming priority based on European Patent Application No. 16170572.8, filed May 20, 2016.

TECHNICAL FIELD

The present invention relates to the field of multipurpose detection units for the detection and/or readout and/or communication with consumer carried tokens such as ID cards, credit cards, driver's licenses, member cards, etc.

PRIOR ART

Automated identification and/or payment by using consumer carried tokens such as ID cards, credit cards, driver's licenses, member cards, etc. has become a key issue in trade. A number of devices exist for these processes, the classical devices including a slot through which the corresponding card has to be guided, or into which the corresponding card has to be inserted for identification and/or transaction. More recently technology has been introduced allowing for contactless identification and/or transaction using various radiofrequency standards, including Bluetooth technology. The corresponding devices need to be reliable, they must be versatile in the sense that they should allow identification and/or transaction with as many as possible different cards, and the should be easily embeddable into existing structures, inter alia allowing for repowering of existing structures, for example checkout counters etc.

EP-A-991028 relates to the determination of the authenticity and integrity of various types of documents such as lottery tickets accomplished by using an electronic verification machine to compare data contained in electronic circuits printed on the document to document data printed on the document.

EP-A-1830324 relates to a self-checkout terminal which includes a coin recycling machine which stores a coin inserted into a coin inlet in accordance with a denomination of the coin and releases the sorted coin through a coin outlet. A coin receiver receives a coin released through the coin outlet. A coin path couples a coin slot and the coin inlet, and a fake coin path diverges from the coin path toward the coin receiver. A judging unit judges whether a coin inserted into the coin slot is real or fake, and a sorting unit sorts a coin judged to be fake into the fake coin path. When a coin inserted into the coin slot is judged to be fake and is sorted into the fake coin path, information that there is something wrong with the coin is provided to a customer. A coin as change is released through the coin outlet.

U.S. Pat. No. 5,918,211 relates to a system and method for influencing and potentially altering a consumer's purchase decisions at the point-of-purchase in a retail store using a portable bar code scanner that is in constant wireless communication with the store and a retailer/manufacturer's computer/controller. The consumer uses the portable bar code scanner to scan products in the store, and if a scanned product is currently under a promotion, the controller alerts the consumer's portable bar code scanner as to the promotion, so that the consumer can to take advantage of the promotion. In another embodiment, the consumer will be identified before beginning shopping by their frequent shopper card, so that the computer/controller, in communication with the portable bar code scanner, can utilize the consumer's past purchase history and offer the consumer promotional product discounts. A video surveillance camera within the portable bar code scanner also allows the retailer to monitor each portable bar code scanner's use throughout the retail establishment for security purposes.

SUMMARY OF THE INVENTION

It is the object of the present invention to propose a new compact and versatile as well as reliable automated identification and/or readout and/or communication device for handling consumer carried tokens such as ID cards, credit cards, driver's licenses, member cards, etc.

According to the invention a device is proposed as defined in the claims.

More specifically, the present invention relates to a device for readout of and/or communication with a consumer carried token. Such a consumer carried token is for example an identity card, passport, a credit card, a driver's license, the user card, or any other similar device. The readout and/or communication device has the ability to communicate with such a token, if it is correspondingly structured, using wireless radiofrequency communication. For example RFID readout is possible, so simple one way readout, but also actual communication using for example low-energy Bluetooth or NFC standards. On the other hand the readout and/or communication device has the ability to communicate with such a token on optical basis. This means that barcode, text (recognized by OCR), QR code, picture, biometric, or other optically detectable/readable information provided on the token can be read out.

To this end the proposed device comprises a first area for wireless radiofrequency detection and/or communication as well as a second area, which is spatially separated from said first area, for a wireless optical detection and/or communication.

According to the invention, preferably said first area is located above said second area, meaning that, seen from a user's perspective, a lower portion of the device provides the area for optical detection and/or communication, and an upper portion of the device, typically arranged vertically above the optical detection part, provides for radiofrequency wireless communication.

According to the invention, said second area comprises a cavity with at least a front opening for inserting said token by a user, bordered by at least a bottom surface, a backside wall, and a top illumination unit, wherein said top illumination unit comprises at least one essentially vertical translucent skirt with its free edge pointing towards the second area as well as an opening through which the light pathway is guided, i.e. the vertical translucent skirt at least partly or fully surrounds the opening.

Furthermore behind and/or below said first area a scanning light source as well as scanning camera is located, both aiming in an upward direction, and above said scanning light source as well as scanning camera a mirror is mounted, for at the same time deflecting the scanning light beam and directing it into said second area onto said bottom surface through said opening in an essentially vertical direction, and deflecting optical information reflected from said token located in said second area arriving at the mirror in an essentially vertical direction, onto said scanning camera.

Alternatively, behind and/or below said first area a scanning light source as well as scanning camera is located, both aiming in a downward direction, into said second area onto said bottom surface through said opening in an essentially vertical direction.

Due to this light pathway a simple and rugged as well as compact construction without necessity of using lenses is possible but still allowing for high-sensitivity optical scanning. Preferably the optical pathway of the scanning is free from any lens (apart from any lenses in the camera module).

As a matter of fact, using the mirror allows for optimum functional element placing in the corresponding device. Furthermore the above-mentioned skirt, which is translucent, allows for optical feedback to the user indicating the functional status of the device. Locating the optical readout unit below the radiofrequency readout unit has the advantage that there is no danger due to the light source of the scanning unit as this part is as low as possible. Further safety is achieved by the mirror redirection making sure that only the cavity is lighted by the light source for the scanning. Furthermore the light source of the scanning module itself indicates where the actual scanning area is located further helping the user to intuitively correctly use the device. The clear spatial separation of the radiofrequency readout unit (e.g. using beacon technology) and of the optical readout unit further enhances reliability as in case of combination of the two readout units there is always the problem that optical as well as radiofrequency readout may take place at the same time leading to undesired interference. If the outermost housing components are made out of a light-fast material or are correspondingly coated, furthermore light only exits at the desired locations in a very controlled manner. Backlighting of the skirt can be used on the one hand to indicate the functional status of the device, but it can also be used for diffuse indirect lighting of the scanning area further reducing detection problems due to undesired reflexes and the like. Preferably scanning light source and camera for the scanning process are located in a vertical direction below the mirror.

According to a first preferred embodiment, the device is characterized in that at least one of said translucent skirt (indicative of the optical detection) and cover plate (indicative of the radiofrequency detection, preferably both, are backlit. The backlighting can be used as an indicator for the functional status of the device. For example white lighting can be used for indicating readiness, red can be used for indicating errors, and green can be used to indicate a successful information scan process. Such backlighting is preferably carried out by LEDs which can e.g. be mounted on respective circuit boards or also directly on a (internal) housing part. As pointed out above, the backlighting can be used for being indicative of the functional status of the device, in case of backlighting of the skirt it can furthermore be used for indirectly illuminating the scanning area to reduce reflexes on the token hampering the scanning process.

On the side of the device facing the user a printed circuit board can preferably be located in an essentially vertical orientation. Further preferably a lower terminal portion thereof can be provided so as to be extending at least partially behind a front portion of the translucent skirt. A plurality of LEDs, preferably in an essentially horizontal row, or a multitude of such rows depending on the color to be irradiated, or one or a row of addressable multicolor LEDs, preferably for color coding the functional status of the device differently and/or for diffuse illumination, is located on the front side of said lower terminal portion for backlighting said skirt and optionally for indirect illumination of said cavity. Preferably in the housing of the device or in an internal housing part of the device a slot is provided for said lower terminal portion.

The illumination as proposed has a further advantage of being well protected against dirt and dust.

Separation of the light for the optical detection process and of the light in particular used for indicating the functional status of the radiofrequency detection area is preferably carefully made sure. Corresponding shielding wall portions can be provided at the required positions in the housing.

Communication of the unit to a central computer station or network can be established using a wire connection or a wireless connection. In the latter case a wireless communication module can integrated into the device or connected thereto.

The skirt can furthermore be provided as a preferably essentially circumferential, vertically extending frame element, which may have, preferably in the front portion, a height visible to the user in the range of 2-20 mm, preferably in the range of 4-15 mm.

The outer housing parts of the device as well as the interior housing parts of the device are preferably essentially light-fast to the frequencies of scanning irradiation and/or functional status backlighting.

According to yet another preferred embodiment, in or behind said first area a light-fast interior housing structure is provided with an opening or the exterior housing structure of the device in this first area is provided with an opening, said opening being covered by a translucent cover plate backlit through said opening, preferably by at least one LED or another light source mounted behind said opening.

The scanning irradiation light beam and the detection light beam are preferably diverted by said mirror by an angle of less than 90°, preferably in the range of 30-80°, particularly preferably in the range of 60-80°. Like this a particularly compact arrangement of the functional elements within the housing is possible.

Internal shielding wall elements can be provided to shield the light of the optical scanning unit from lighting indicating the functional status of the device.

The scanning light source(s) as well as the scanning camera can be provided in one single unit, preferably together with an electronic scan module. These elements can further preferably mounted on a common mounting unit which can then easily be attached to the housing of the device or an internal frame element of the device.

According to one preferred embodiment the presently proposed device is provided as a tabletop device having a foot portion, an arm portion extending from the foot portion in an essentially vertical direction, and a head portion, the area above of the foot portion and in front of the arm portion being covered by parts of the head portion defining said second area.

The head portion of this tabletop device comprises a horizontal or preferably inclined to the user top cover surface covered by a top cover plate forming and defining said first area. Preferably scanning light source as well as scanning camera and preferably an electronic scan module are located at least partly in said foot portion and at least partially behind said backside wall.

Further preferably a printed circuit board for backlighting and controlling said first area can be arranged, preferably in an essentially horizontal orientation, in a second cavity of a housing structure forming the top portion or being inserted into the top portion of the head portion and preferably above of the scanning light source as well as scanning camera.

According to another preferred embodiment of the device, it is provided as a wall-mounted device having a front cover housing and a back cover housing, wherein between said front cover housing and back cover housing there is provided a circumferential groove for receiving an opening in a wall or glass panel. Having this structure it is possible to mount the internal parts either on the front cover housing or on the back cover housing, attach the former or the latter to an opening in the corresponding wall structure, and then putting the respective other housing part from the other side of the wall to close the device. In particular for installation at typical POS/retail counters which have transparent walls separating the consumer area from the personnel area these wall-mounted devices are very useful. Their installation is easily possible by creating a corresponding opening in the existing transparent wall structure, and placing the corresponding device into that opening. All that needs to be done is to connect to the corresponding device to the already existing infrastructure, i.e. to the computer registering the goods and/or the flow of cash and for example also to a conventional input device like a pin device.

What is particularly advantageous in relation with the proposed devices is that it is not limited to classical payment devices. Due to the optical detection pathway it is possible to include identification information in the process. For example when selling alcohol all that needs to be done is that the consumer inserts his ID or driver's license into the cavity for the optical detection, and then automatically the age can be determined and authority can be given to sell alcohol or cigarettes. Also backtracking of corresponding activities is possible using these scanning abilities. In addition, the ID validation in conjunction with credit card payments can be much simplified by this "user self serve" ID scanning.

In particular in case of such a wall-mounted device it is further possible that the front cover housing has a front opening and is defining said second area as a cavity defined by a bottom surface, two respective lateral side surfaces and a backside surface and to the top bordered by the top illumination unit.

The first area can be located above said second area and is oriented vertically, so is directly facing the user. It is however also possible to have a more bulging structure so that also here the second area can be provided slightly inclined towards the top, so that the corresponding surface is directed to the typical eye height of the users.

Preferably the front cover housing is light-fast (meaning essentially non-transparent to the frequencies of the optical detection and of the backlighting), and in the region of said first area is provided with an opening covered by a translucent cover plate.

Preferably behind said opening a vertically oriented printed circuit board can be located including means for backlighting said translucent cover plate in order to allow to indicate the functional status of the first area.

In a top portion of the unit, behind said first area, there can be provided an inner housing element providing for a light channel for the optical scanning process, provided with wall portions acting as mounts for the scanning unit, preferably located in a top portion of the inner housing element.

Furthermore the present invention relates to the use of a device as described above for at least one of user identification, user payment identification and/or initiation and/or full handling of payment, preferably by at least one of barcode information, OCR information, biometric information, picture information, radiofrequency transmittable information including Bluetooth and/or NFC, provided on said token.

Optionally the device can be coupled to or supplemented with an input device for user identification input such as pin information, and/or with a token contacting unit.

As pointed out above, the device is preferably integrated into an existing electronic system of a store or the like.

Such a device can be operated/installed as follows:

Upon first connection (typically via USB or Ethernet/Wife) or switch on of the cash register a signal sound is generated by the device and a double signal sound can be generated if the software on the cash register successfully recognizes the device and indicates readiness. If the device is ready typically the backlighting LEDs for both areas, the wireless radiofrequency detection area and for the wireless optical detection area, are on and on white. Due to the indirect reflection of the skirt also the cavity of the optical detection is lighted in white light. This is the on hold status.

If something is introduced into the optical detection cavity automatically the scanner is activated. The backlighting of the skirt remains white, but the colored light, typically red light, of the scanner irradiation is switched on, i.e. the optical scanning cavity is now fully lighted in red. The camera is switched on for detection and the scanner tries to scan any optical information in the cavity, preferably in the bottom area of the cavity. If for an extended time span, typically a few seconds, no movement is detected by the camera in the optical detection cavity, the scanning unit is switched off again.

If the scanning unit successfully scanned information from an object inserted into the optical detection cavity the red scan light switches of and the backlighting of the skirt switches from white to green. Further this can be assisted by a signaling beep to indicate successful scanning. Typically subsequently the scanner is switched to an inactive mode for a few seconds and is then on hold again.

If the scan is unsuccessful, e.g. because an invalid barcode or the like is detected, the red scanning light is switched of, and the white backlighting of the skirt is switched to a blinking red backlighting. Typically also here subsequently the scanner is switched to an inactive mode for a few seconds and is then switched to on hold again.

One preferred use of the proposed device is that it is used in parallel for on the one hand checking a credit card (or equivalent token) used for actual payment (either using the same device or another specific credit card device) and on the other hand checking an ID card with the proposed device, both automatically. In many countries in order to allow for a credit card payment showing of an ID card has become mandatory. The proposed device providing for automatic ID card identification and checking simplifies this process and in particular increases track ability of the process compared with a visual showing of an ID card to personnel at the counter.

Further embodiments of the invention are laid down in the dependent claims.

BRIEF DESCRIPTION OF THE DRAWINGS

Preferred embodiments of the invention are described in the following with reference to the drawings, which are for the purpose of illustrating the present preferred embodiments of the invention and not for the purpose of limiting the same. In the drawings.

DESCRIPTION OF PREFERRED EMBODIMENTS

Figure 5:
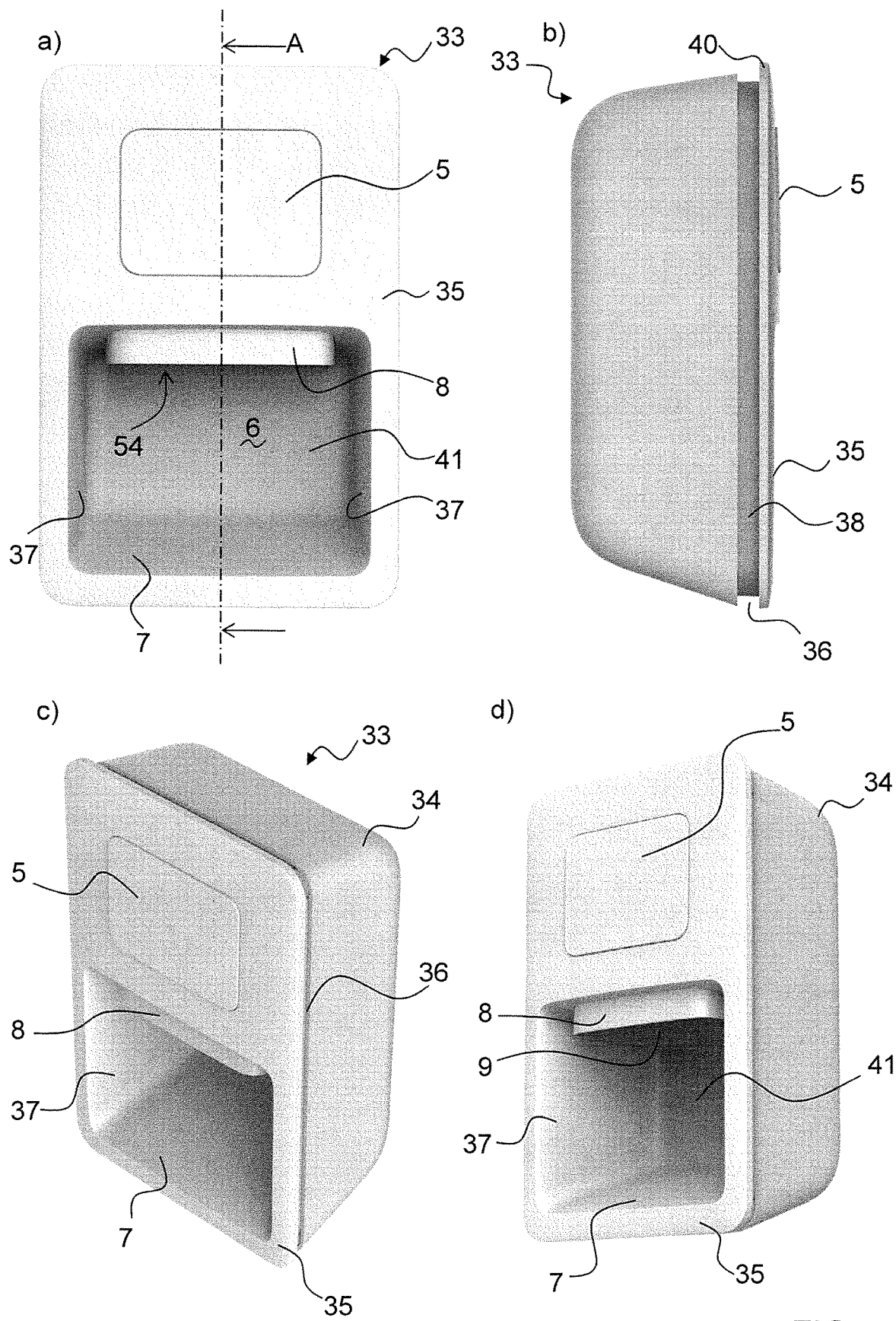
FIG. 5 shows a cut along line A-A as illustrated in FIG. 4 a) through the wall-mounted device.
Figure 6:
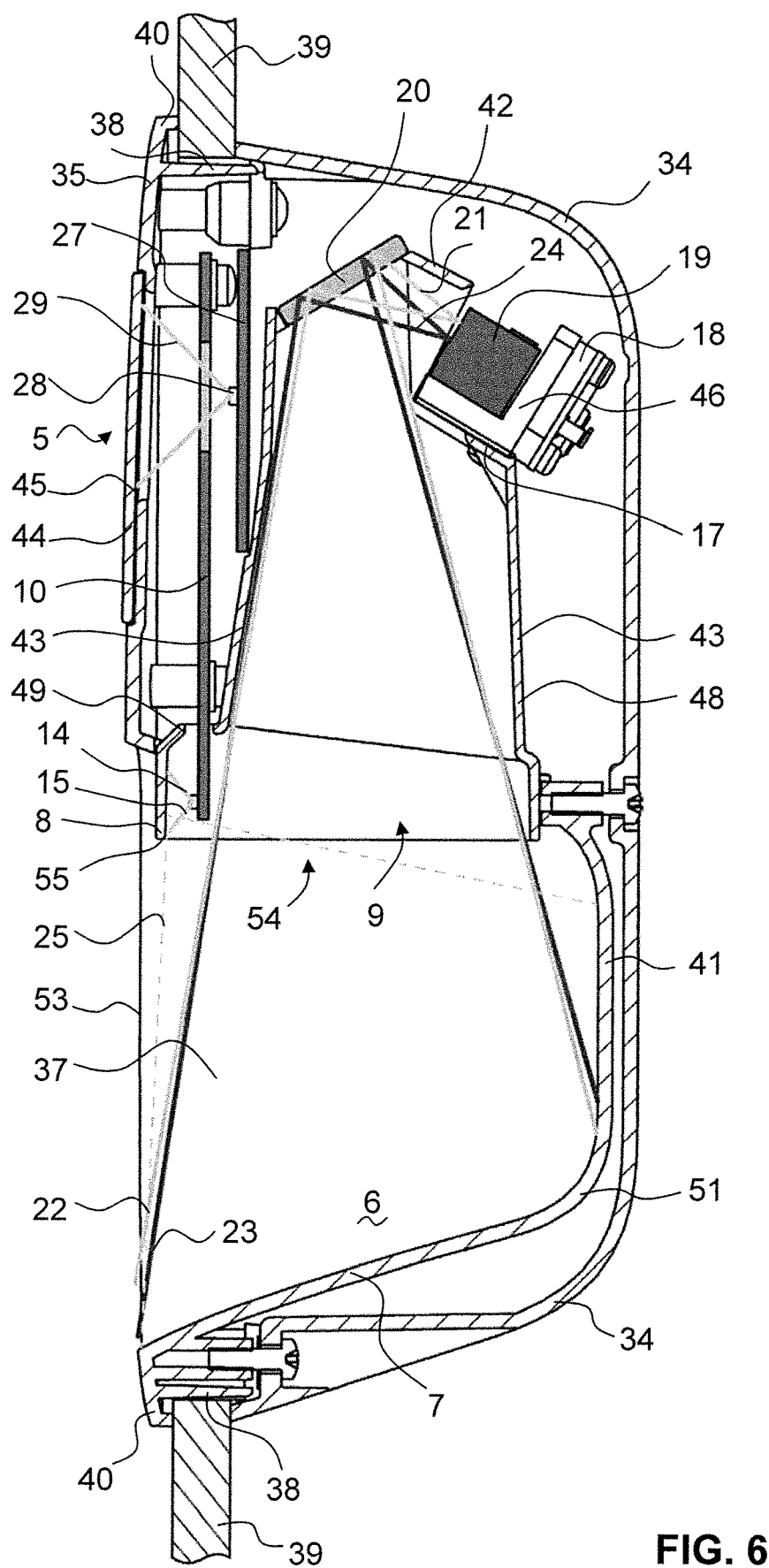
FIG. 6 shows the assembly and installation steps of a wall-mounted device, specifically in a) the assembly of the elements mounted on the inner housing element, in b) the attachment of the inner housing element on the front cover housing and in c) the installation by inserting the front cover with the mounted in a housing element in an opening in a wall from a front side and covering by a back cover.
Figure 7:
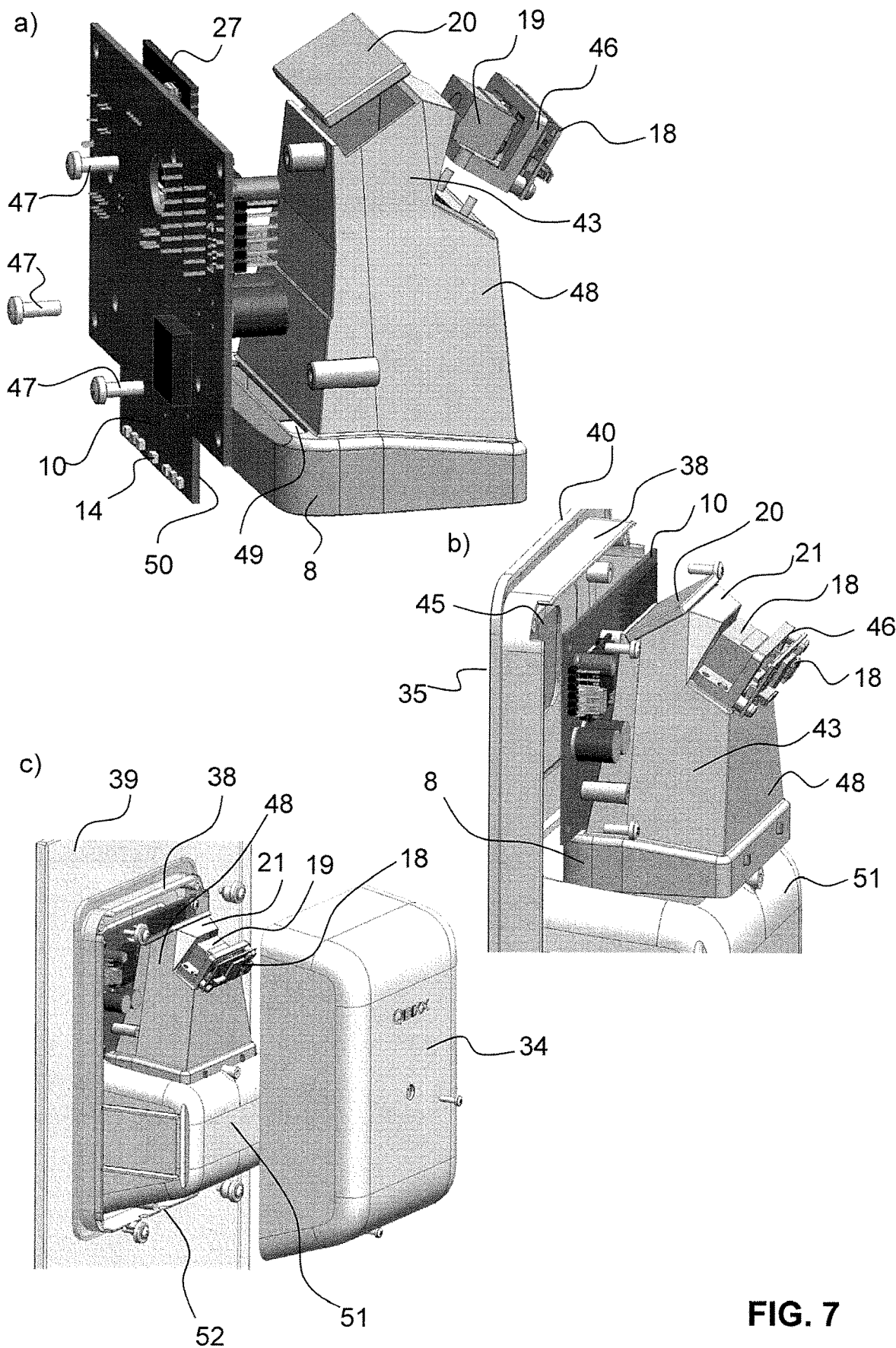
FIG. 7 in a) shows an explosion representation of the inner housing element and the corresponding functional elements attached thereto showing the assembly process, in b) shows how this assembled interior element is then connected to a front cover plate; in c) shows how the pre-assembled front cover plate with the functional elements mounted thereon can then be inserted into a wall opening.

The present invention shall be illustrated in detail by referring to two different embodiments, one tabletop device as illustrated in FIGS. 1-4, and one wall mounted device illustrated in FIGS. 5-7.

Figure 1:
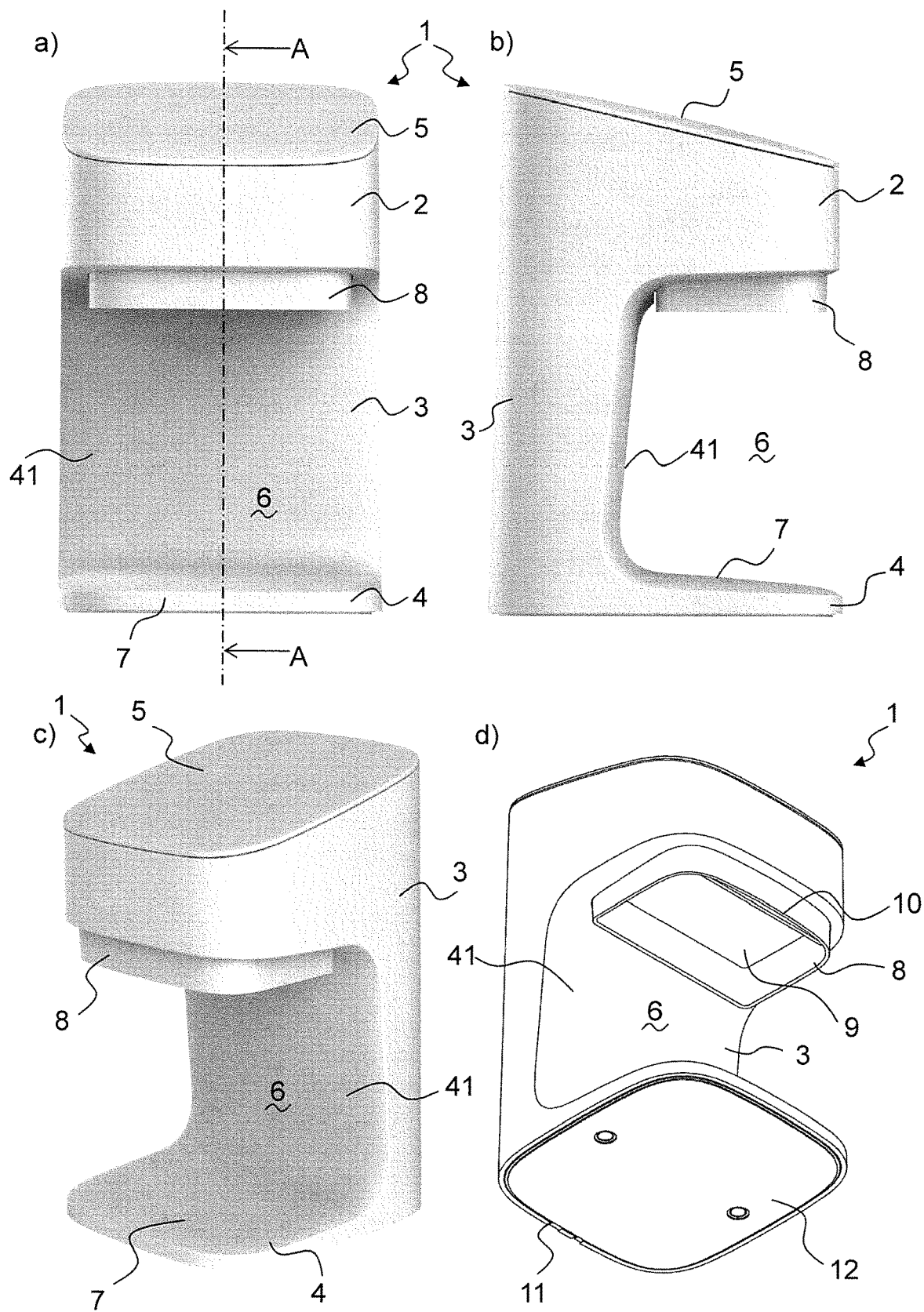
FIG. 1 shows various illustrations of a tabletop device, namely in a) a front view, in b) a side view, in c) a perspective view from above, and in d) a perspective view from below.

In FIG. 1 a)-d) various illustrations of a tabletop device 1 according to the present invention is illustrated. The corresponding device 1 comprises a foot portion 4, an arm portion 3 extending from and above the foot portion 4 and a head portion 2 located at the top end of the arm portion 3. The head portion 2 at least partly extends over and above the foot portion 4, specifically over a bottom surface 7 of the foot portion 4 forming thus a cavity 6, which is formed and bordered by the foot portion 4, namely the bottom surface 7 thereof, the arm portion 3, namely the backside wall 41 thereof, and the bottom side of the head portion 2, which latter as a particular feature comprises a circumferential translucent skirt 8, which surrounds and borders an opening 9 in the underside of the head portion.

On the top side of the head portion 2 and forming the top surface thereof there is provided a wireless radio frequency detection area 5. This area 5 is in this embodiment not located horizontally but is slightly inclined towards the user.

This wireless radio frequency detection area 5 is typically graphically highlighted and indicated by pictograms or the like or in particular by back lighting, which will be detailed further below.

The cavity 6 on the other hand is provided as an active scan area for wireless optical detection, as will be detailed further below.

The unit comprises connection openings 11 in the region of the foot portion 4 at the bottom, and the foot portion 4 is closed on its underside by a bottom plate 12.

Figure 2:
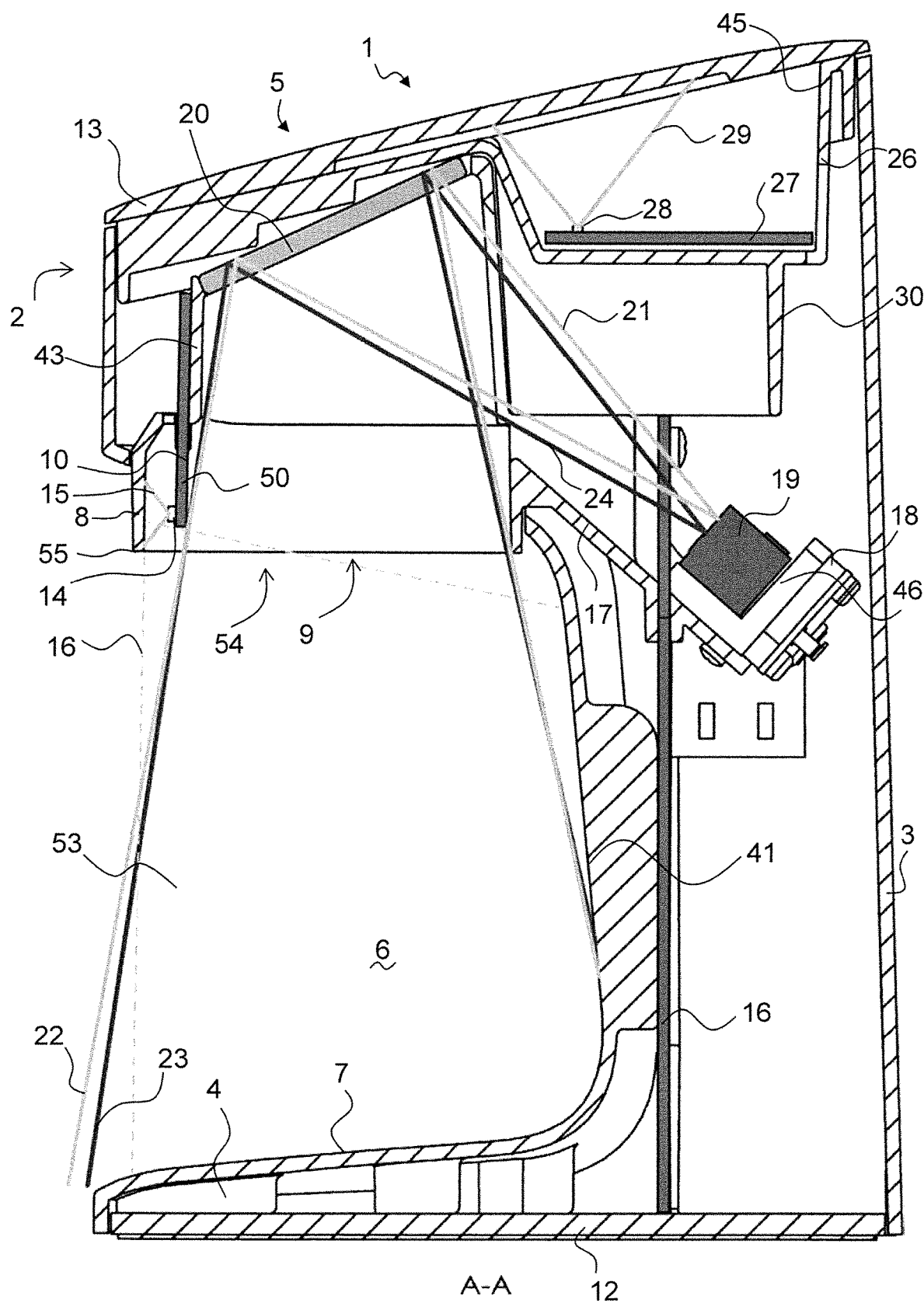
FIG. 2 shows a cut along line A-A as illustrated in FIG. 1 a) through the tabletop device.

In FIG. 2 a) cut along the line A-A as illustrated in FIG. 1 a) is given, detailing the functional elements located in the housing. The outer housing, as visible in a shaded manner in FIG. 1a)-c), is typically made of a light-fast material, i.e. it is essentially nontransparent for the light used for the optical scanning and/or for any optical indication backlighting of the functional states of the device. Only a top cover plate and the skirt 8 are typically structured in an at least partially translucent manner to allow for backlighting user information.

As one can see in the top portion of FIG. 2, the head portion 2 of the housing comprises an opening which is open to the top. In this opening an inner housing structure 26 is inserted from the top, which is preferably also made of a light-fast material. In this inner housing structure 26 a cavity is provided open only to the top, with some opening for internal connection of the printed circuit boards, and in this cavity a printed circuit board 27 for low energy Bluetooth communication (radio frequency alternatively another NFC technology can be used) and for backlighting of the wireless radio frequency detection area 5 is provided. In this case this printed circuit board 27 is arranged horizontally, and it comprises at least one LED 28 which can be activated to back light the first area.

To this end on top of the internal housing structure 26 for the Bluetooth beacon (or NFC device) printed circuit board 27 there is provided an at least partially translucent top cover plate 13, which if backlit from the interior, either transmitting the light to the user only in specifically translucent portions thereof (the translucent portions thereof for example being structured as a pictogram indicating the functionality of the surface) or as a whole plate. Below this area defining the wireless radio frequency detection area 5 there is located the functional elements for the wireless optical detection area. These elements include a further internal housing element which partly also provides for the skirt 8 and for a mounting 17 for the camera/scan module/scan module light. The unit 19 including a camera and a light source, is provided on a mounting unit 46. On the same mounting unit 46 there is provided a scan module 18, which is a printed circuit board for controlling the camera/light source 19. This whole unit is mounted on the mounting wall portion 17 of this internal housing.

On the one hand this unit 19 provides for the light necessary for the successful scanning process. This light cone 21 emitted by this unit 19 in an upward direction impinges unto and is reflected by a mirror 20, which is mounted right below the internal housing structure 26. The angular orientation of this mirror 20 is adapted, so that the corresponding reflected cone 22 lights out the cavity 6 and preferably just about the bottom surface 7 and for safety reasons not much more than that.

Also included in the unit 19 is a camera for the detection of a target and the actual scanning process. Light reflected form an token located in the scan module illuminating cone 22 is schematically indicated again as a cone of possible reflections 23. This light reflected by the token in the cavity 6 also impinges on and is reflected by the same mirror 20 and then is detected as illustrated in a pathway 24 by the camera in unit 19. The corresponding data processing for the actual recognition/OCR can either be carried out in the scan module 18 directly or in a main printed circuit board 16 located vertically behind the cavity of the housing in the foot portion 3.

As pointed out above, as concerns the activity of the wireless optical detection area 6, there is provided a translucent skirt 8 for optical feedback for the user. The lighting of this skirt 8 is provided by a vertical illumination printed circuit board 10 located on a side of the head portion 2 facing the user. A bottom lower most portion 50 of this printed circuit board penetrates through a slot in the inner housing unit and extends behind a front portion of the translucent skirt 8. On the side of the printed circuit board facing the backside of the skirt 8 there is provided one or a a row of LED's 14 for backside illumination of the skirt 8. A corresponding colour code for this backlighting can be used to provide for status information to the user as outlined above.

On the other hand due to reflection on the inner side wall of the translucent skirt 8 furthermore indirect and diffuse illumination 25 of the active scan area is made possible reducing undesired reflections hampering the scanning process. In particular under difficult outer light conditions this indirect illumination which is present in the cavity 6 in addition to the illumination 21/22 can significantly improve the scanning process.

Figures 3, 4:
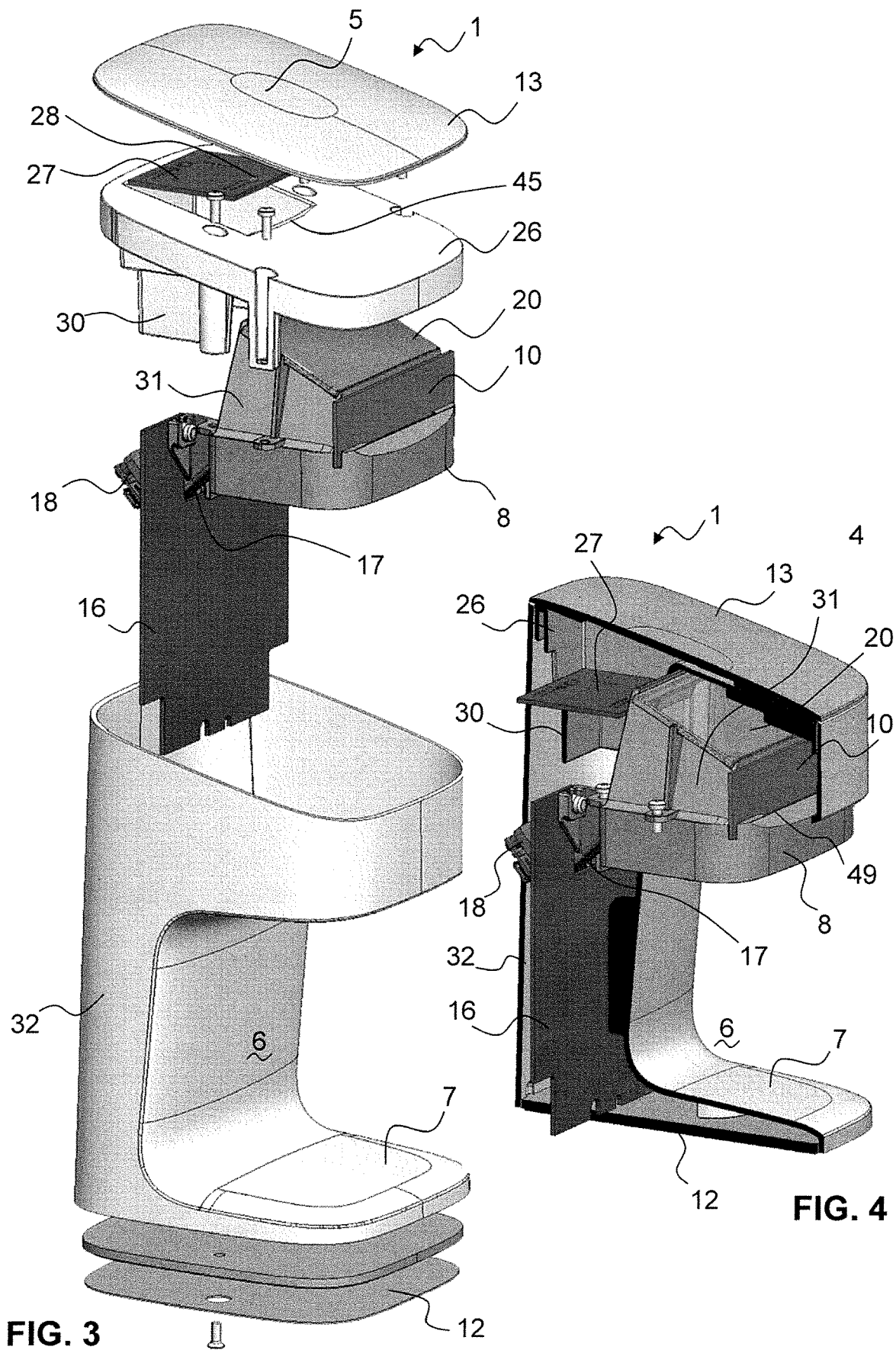
FIG. 3 shows an explosion representation of the tabletop device in a) and a mixed cut/perspective view in b)
FIG. 4 shows various illustrations of a wall-mounted device, namely in a) a front view, in b) a side view, in c) a perspective view from above, and in d) a perspective view from below.

In FIG. 3 an explosion representation of the corresponding device 1 is shown. It also illustrates the assembly process of the corresponding unit. Typically in a first assembly step the main circuit board 16 is attached to the internal housing unit including also the skirt 8 and further providing for shieling walls 21 avoiding that the optical illumination and detection light path interferes with the signalling light path by the back lighting. It also carries the scan module and the mirror 20. Typically this main printed circuit board 16 together with the housing including the skirt 8 and the scan module is assembled and inserted into the main housing 22 from a top direction. Not indicated in the figures is the wiring connecting the various printed circuit board elements. Also not indicated is the wiring for connection of the unit to an external computer system and for power supply. These wirings are typically guided outside of the housing via the connection openings 11 illustrated in FIG. 1*d*).

In a next step also from the top the internal housing structure 26 with the printed circuit board 27 attached to it is put on top and inserted in to the main housing 32 as well. In a last step the cover plate 30 is attached to the top of the device, typically by gluing or snap-in. Subsequently the bottom plate 12 can be screwed to the foot portion after having guided the necessary wiring out through openings 11.

In FIG. 4 yet another perspective and partly opened representation of the device is given in the assembled state. It can be recognized how closely packed and efficiently arranged the functional elements are in this construction.

A wall mounted device according to the present invention is illustrated in FIG. 5 in various representations as concerned the outer appearance. In this embodiment the device comprises a front cover housing 35 which in the top portion thereof comprises the wireless radio frequency detection area, which in this case is arranged vertically.

Below this wireless radio frequency detection area 5 there is located a true cavity 6, which is bordered to the bottom by the bottom surface 7, to both lateral sides by lateral walls 37, and to the top by the optical path way surrounded by a skirt 8 having the same function as in the above mentioned first embodiment.

This wall mounted device 33 is covered from the backside by a back cover housing 34, and between the back cover housing 34 and the front cover housing 35 there is provided a circumferential groove 36, which is adapted to receive a corresponding wall structure which has an opening in to which this groove fits snugly. The bottom of this groove is defined by wall structure 38, which can either be part of the back cover housing 34 or of the front cover housing 35 in this particular embodiment it is part of the front cover housing 35.

In FIG. 6 a cut along the line A-A as illustrated in FIG. 5*a*) is given. As one can see in this embodiment the front cover housing 35 on the one hand provides a circumferential wall covering portion 40 adapted to cover the edge portion of the corresponding hole in the wall or glass panel 39 into which the wall mounting devices to be integrated. Penetrating in to the corresponding opening in the wall 39 there is provided a rib 38 of longer extension than the thickness of the wall 39. In the top portion of the front cover housing 35 and to define the wireless radio frequency detection area this light-fast front cover housing 35 is provided with an opening 45 which is covered by a cover plate 44 for the first area. This cover plate is either translucent as a whole or it is provided with translucent areas (e.g. defining a pictogram indicating the functionality to the user) so as to provide for a illuminated or backlit specific information or pictogram.

In the bottom portion of the front cover housing 35 there is a deeply indented portion which on the one hand forms the bottom surface 7 and on the other hand also the backside wall 41 and the lateral side walls 37. This cavity portion 51 is therefore in this case part of the front cover housing 35.

There is further an internal inner housing element which forms the skirt 8. It further comprises a light path wall 34 and provides for a mounting 17 for holding a unit similar to the one as described in the context of the above mentioned first embodiment, so including a camera including scan module and light source 19, a mounting unit 46, and a scan module 18. Also in this case the light source and camera optical axes are pointing upwards and the scan module illuminating cone 21 impinges and is redirected by mirror 20 and pointed downwards as scan module illuminating cone 22 behind the mirror. This cone 22 is illuminating just the cavity 6 and the bottom surface 7 and for safety reasons preferably not more than that.

Light reflected by a token arranged in the cavity 6 is guided back by the path as illustrated by cone 23, which impinges onto mirror 20 and then is redirected to cone 24 and impinges onto the camera of unit 19. Again a very compact arrangement of the functional elements is possible, the camera unit 19/18 again being located vertically lower than the mirror and behind the wireless radio frequency detection area.

Illumination of the skirt 8 in this case is provided by the illumination printed circuit board 10, which also in this case takes the function of the main printed circuit board. A lowermost portion of this printed circuit board 10 extends through a slot 49 in the inner housing element 48 and extends behind the skirt 8 in a top front portion thereof. A row of LED's 14, or possibly even several rows of LED's depending on the colour, are located typically in a horizontal arrangement on this bottom portion 50 for backlighting according to cone 15 the skirt 8 for indicating functional status information to the user. On the other hand the same LED irradiation leads to indirect diffuse illumination according to cone 25 increasing scanning sensitivity and reliability as discussed in the context of the first embodiment.

In this case the backside illumination and the functional devices (Bluetooth/NFC beacon) of the wireless radio frequency detection are provided by another vertically mounting printed circuit board 27 again with at least one corresponding LED 28 for backlighting 29 of the cover plate 44.

In FIG. 7 *a*) an explosion representation of the inner housing element and the corresponding functional elements attached thereto is given showing the assembly process. The inner housing element 48 is provided with the mirror 20 and with the scanning element 18, 19 and 46, and also the main printed circuit board 10 as well as the Bluetooth/NFC beacon board 27 are attached to this interior building block of the device. In a next step, as illustrated in FIG. 7b), this assembled interior element is then connected to a front cover plate 45, typically by screwing the assembled element to the cover plate 35. Corresponding wiring between the printed circuit board is not indicated specifically, and can be carried out either when assembling the elements according to FIG. 7a) or in the process as illustrated in FIG. 7b).

This pre-assembled front cover plate 38 with the functional elements mounted thereon can then be inserted into a wall opening 39 as illustrated in FIG. 7c), cables for power supply and/data connection to a central system can be guided out through openings 52, and then the back cover plate 34 can be attached from the other side of the wall 39, showing how simple an installation of the corresponding device is possible.

Figure 8:
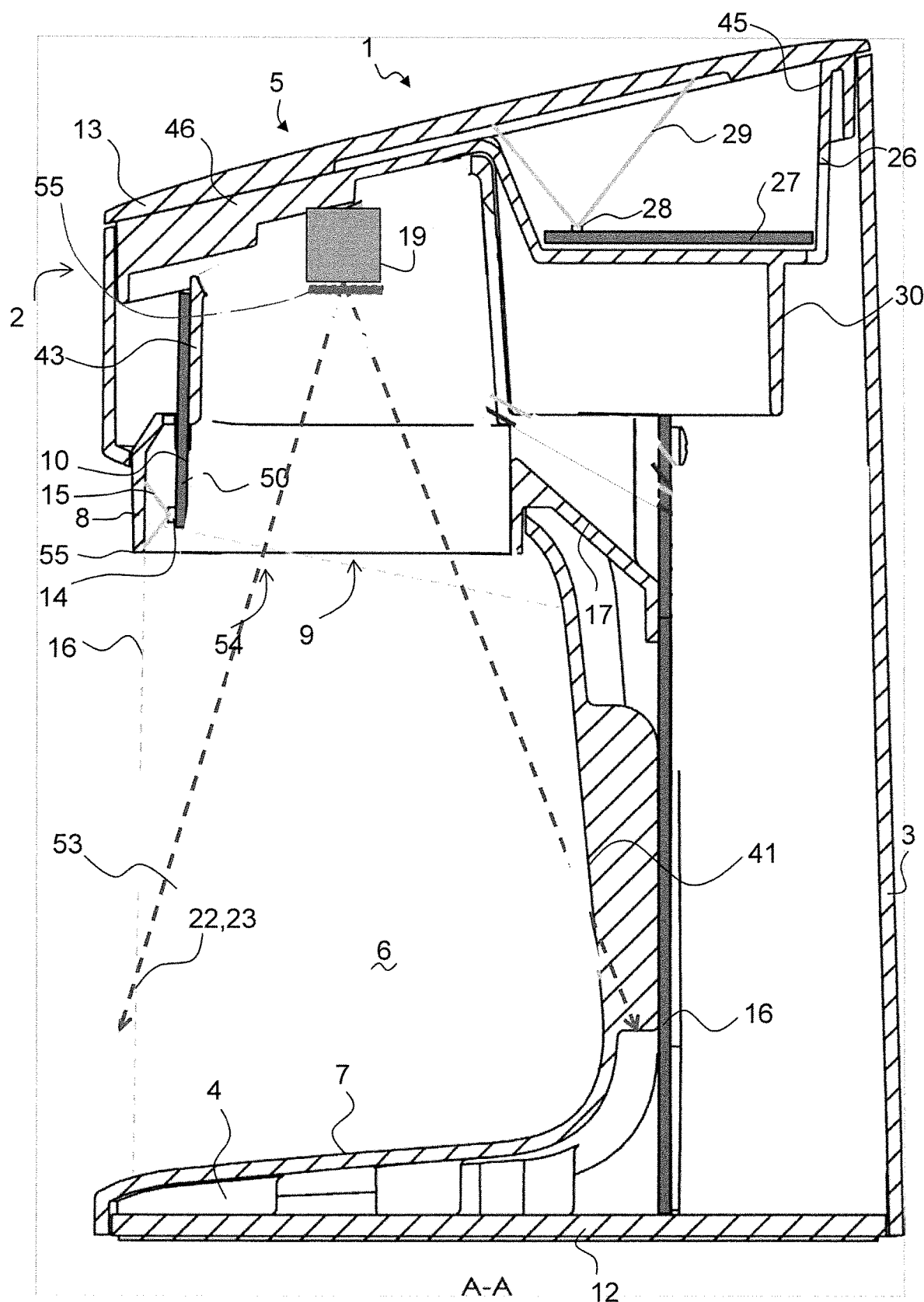
FIG. 8 shows a cut along line A-A as illustrated in FIG. 1 a) through a tabletop device in which the unit 19 is mounted without mirrir and directly illuminating the detection area.
Figure 9:
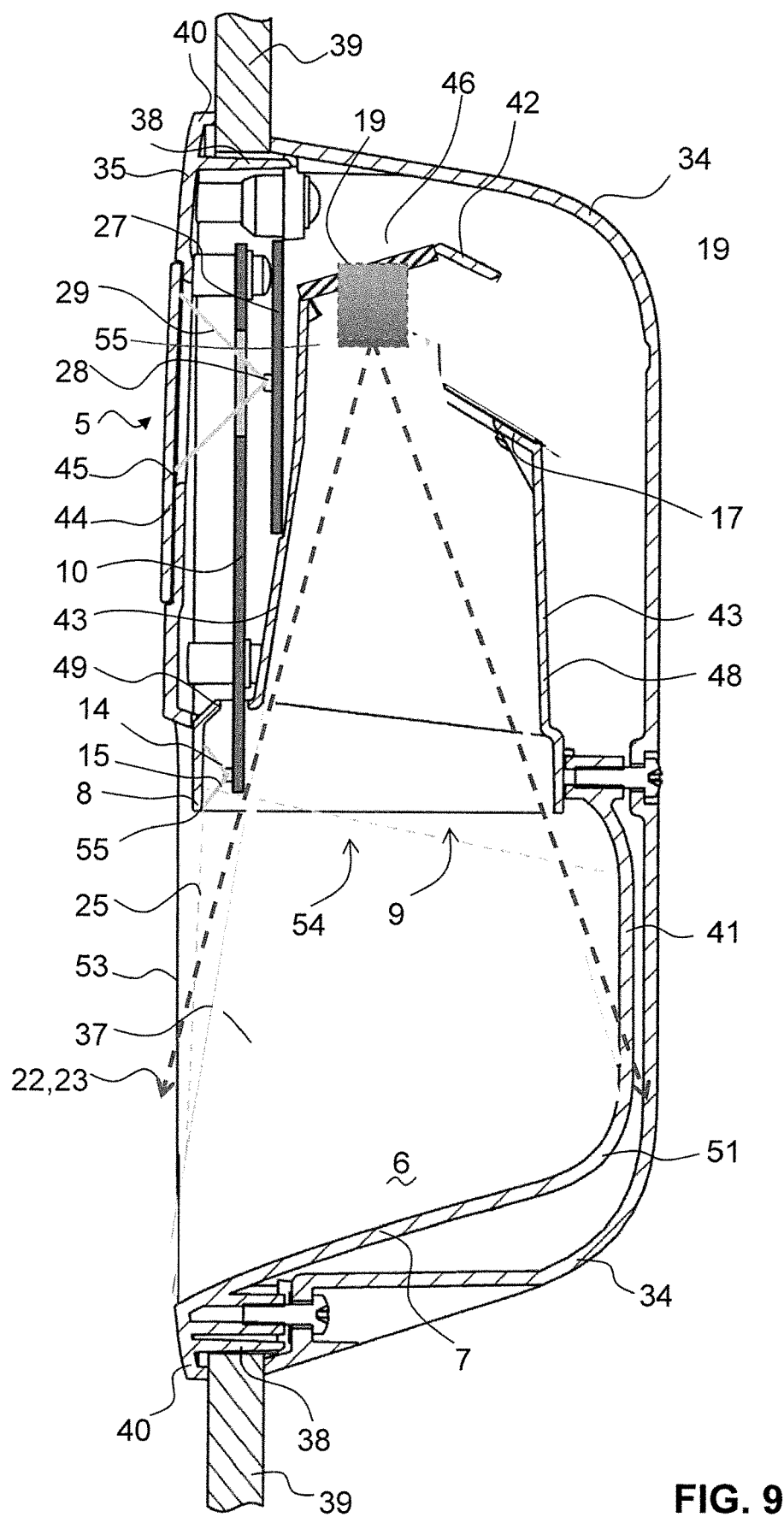
FIG. 9 shows a a cut along line A-A as illustrated in FIG. 4 a) through a wall-mounted device in which the unit 19 is mounted without mirrir and directly illuminating the detection area.

An alternative way of locating the scanner is illustrated in FIGS. 8 and 9. Instead of arranging the camera including scan module and light source 19 in a way such that the illuminating cone and the camera detection cone point upwards and then need to be redirected by mirror into the active scan area 6, it is possible to locate the corresponding module 19 simply above the active scan area 6 and above the opening 9. The corresponding scan module illuminating cone 22 is then simply pointing downwards as illustrated in FIGS. 8 and 9, and so is the camera detection cone 23. In order to obtain optimum resolution and sensitivity in front of the camera of unit 19 preferably a lens 55 is mounted. Respective remaining distortions of the picture received by the corresponding camera can be compensated electronically if needed to improve the pattern and/or character recognition process.

LIST OF REFERENCE SIGNS

| | |
|---|---|
| 1 | tabletop device |
| 2 | head portion of 1 |
| 3 | arm portion of 1 |
| 4 | foot portion of 1 |
| 5 | wireless radiofrequency detection area |
| 6 | cavity, wireless optical detection area, active scan area |
| 7 | bottom surface of 6 |
| 8 | translucent skirt |
| 9 | opening within 8 |
| 10 | illumination printed circuit board |
| 11 | connection openings in housing |
| 12 | bottom plate |
| 13 | top cover plate |
| 14 | row of LED for backside illumination of 8 on 10 |
| 15 | backside illumination of 8 |
| 16 | main printed circuit board |
| 17 | mounting for camera/scan module light/scan module |
| 18 | scan module |
| 19 | camera including scan module and light source |
| 20 | mirror |
| 21 | scan module illuminating cone before mirror |
| 22 | scan module illuminating cone behind mirror |

-continued

LIST OF REFERENCE SIGNS

| | |
|---|---|
| 23 | camera detection cone before mirror |
| 24 | camera detection cone behind mirror |
| 25 | indirect illumination of active scan area |
| 26 | housing structure for Bluetooth beacon/NFC |
| 27 | printed circuit board for Bluetooth/NFC communication |
| 28 | LED for backside illumination of top cover plate |
| 29 | illumination cone of 28 |
| 30 | shielding wall |
| 31 | shielding wall |
| 32 | main housing |
| 33 | wallmounted device |
| 34 | back cover housing |
| 35 | front cover housing |
| 36 | groove for receiving wallplate |
| 37 | lateral walls of 6 |
| 38 | bottom wall of 36 |
| 39 | wall/glass panel/Plexiglas panel |
| 40 | circumferential wall covering portion of 34 |
| 41 | backside wall of 6 |
| 42 | shielding wall |
| 43 | light path wall |
| 44 | cover plate for 5 |
| 45 | opening in 35 for light path and backlighting of 44 |
| 46 | mounting unit for 18 and 19 |
| 47 | screws |
| 48 | inner housing element |
| 49 | insertion slot for lowermost portion of 10 in 48 |
| 50 | lowermost portion of 10 with 14 |
| 51 | cavity portion of 35 |
| 52 | openings for cables |
| 53 | front opening of 6 |
| 54 | top illumination unit |
| 55 | lens in front of 19 in case of construction without mirror |

The invention claimed is:

1. A device for at least one of readout of communication with a consumer carried token, wherein the device comprises
a first area for at least one of wireless radiofrequency detection or wireless radiofrequency communication;
a second area spatially separated from said first area for at least one of wireless optical detection or wireless optical communication;
wherein said first area is located above said second area;
wherein said second area comprises a cavity with at least a front opening for inserting said token by a user, bordered by at least a bottom surface, a backside wall, and a top illumination unit,
wherein said top illumination unit comprises
at least one essentially vertical translucent skirt with its free edge pointing towards the second area;
as well as an opening,
said skirt at least partly surrounding said opening;
and wherein
either behind or below said first area a scanning light source as well as scanning camera is located, both aiming in an upward direction, wherein above said scanning light source as well as scanning camera a mirror is mounted, for at the same time deflecting the scanning light beam and directing it into said second area onto said bottom surface through said opening in an essentially vertical direction, and deflecting optical information reflected from said token located in said second area arriving at the mirror in an essentially vertical direction, onto said scanning camera or behind or below said first area a scanning light source as well as scanning camera is located, both aiming in a downward direction, into said second area onto said bottom surface through said opening in an essentially vertical direction.

2. The device according to claim 1, wherein at least one of said translucent skirt and cover plate, or both, are backlit, wherein the backlighting is indicative of the functional status of the device.

3. The device according to claim 2, wherein on the side of the device facing the user a printed circuit board is located in an essentially vertical orientation, a lower terminal portion thereof extending at least partially behind a front portion of the translucent skirt, and wherein a plurality of LEDs is located on the front side of said lower terminal portion for backlighting said skirt and if needed for indirect illumination of said cavity.

4. The device according to claim 1, wherein the skirt is provided as a vertically extending frame element having a height visible to the user in the range of 2-20 mm.

5. The device according to claim 2, wherein the outer housing parts of the device as well as the interior housing parts of the device are essentially light-fast to the frequencies of scanning irradiation or functional status backlighting, and wherein in said first area a light-fast interior housing structure is provided with an opening or the exterior housing structure is provided with an opening, said opening being covered by a translucent cover plate backlit through said opening.

6. Device according to claim 1, wherein the scanning irradiation light beam (21, 22) and the detection light beam (23, 24) are diverted by said mirror by an angle of less than 90°.

7. Device according to claim 1, wherein internal shielding wall elements are provided to shield the light of the optical scanning unit from lighting indicating the functional status of the device.

8. The device according to claim 1, wherein scanning light source as well as scanning camera are provided in one single unit.

9. The device according to claim 1, wherein it is provided as a tabletop device having a foot portion,
an arm portion extending from the foot portion in an essentially vertical direction, and
a head portion,
the area above of the foot portion and in front of the arm portion being covered above by at least parts of the head portion, thus defining said second area,
wherein the head portion comprises a horizontally arranged or inclined to the user top cover surface covered by a top cover plate forming and defining said first area.

10. The device according to claim 1, wherein it is provided as a wall-mounted device having a front cover housing and a back cover housing, wherein between said front cover housing and back cover housing there is provided a circumferential groove for receiving an opening in a wall or glass panel.

11. The device according to claim 10, wherein the front cover housing has a front opening and is defining said second area as a cavity defined by a bottom surface, two respective lateral side surfaces and a backside surface and to the top by the top illumination unit.

12. The device according to claim 10, wherein the first area is located above said second area and is oriented vertically.

13. The device according to claim 10, wherein in a top portion of the unit, behind said first area, there is provided an inner housing element providing for a light channel for the optical scanning process, provided with wall portions acting as mounting for the scanning unit.

14. A method of using a device according to claim 1 for at least one of user identification or user payment, by at least one of barcode information, OCR information, biometric information, picture information, radiofrequency transmittable information including Bluetooth or NFC, provided on said token.

15. The device according to claim 1, wherein both of said translucent skirt and cover plate are backlit, by LEDs mounted on respective circuit boards, wherein the backlighting is indicative of the functional status of the device.

16. The device according to claim 2, wherein on the side of the device facing the user a printed circuit board is located in an essentially vertical orientation, a lower terminal portion thereof extending at least partially behind a front portion of the translucent skirt, and wherein a plurality of LEDs, in an essentially horizontal row, for color coding the functional status of the device differently, is located on the front side of said lower terminal portion for backlighting said skirt and for indirect illumination of said cavity, wherein in the housing of the device a slot is provided for said lower terminal portion.

17. The device according to claim 2, wherein the skirt is provided as a essentially circumferential, vertically extending frame element having a height visible to the user in the range of 4-15 mm.

18. The device according to claim 2, wherein the outer housing parts of the device as well as the interior housing parts of the device are essentially light-fast to the frequencies of scanning irradiation or functional status backlighting, and wherein in said first area a light-fast interior housing structure is provided with an opening or the exterior housing structure is provided with an opening, said opening being covered by a translucent cover plate backlit through said opening, by at least one LED mounted behind said opening.

19. The device according to claim 1, wherein the scanning irradiation light beam and the detection light beam are diverted by said mirror by an angle in the range of 60-80°.

20. The device according to claim 1, wherein scanning light source as well as scanning camera are provided in one single unit, together with an electronic scan module, mounted on a common mounting unit.

21. The device according to claim 1, wherein it is provided as a tabletop device having
a foot portion,
an arm portion extending from the foot portion in an essentially vertical direction, and
a head portion,
the area above of the foot portion and in front of the arm portion being covered above by at least parts of the head portion, thus defining said second area,
wherein the head portion comprises a horizontally arranged or inclined to the user top cover surface covered by a top cover plate forming and defining said first area, wherein scanning light source as well as scanning camera and an electronic scan module are located at least partly in said foot portion and at least partially behind said backside wall, or in the head portion and wherein a printed circuit board for backlighting and controlling said first area is arranged, in an essentially horizontal orientation, in a second cavity of a housing structure forming the top portion or being inserted into the top portion of the head portion and above of the scanning light source as well as scanning camera.

22. The device according to claim 10, wherein the first area is located above said second area and is oriented vertically, wherein the front cover housing is light-fast, and in the region of said first area is provided with an opening covered by a translucent cover plate, and wherein behind said opening a vertically oriented printed circuit board is located including means for backlighting said translucent cover plate to indicate the functional status of the first area.

23. The device according to claim 10, wherein in a top portion of the unit, behind said first area, there is provided an inner housing element providing for a light channel for the optical scanning process, provided with wall portions acting as mounting for the scanning unit, located in a top portion of the inner housing element.

24. A method of using a device according to claim 1 for at least one of user identification, user payment, by at least one of barcode information, OCR information, biometric information, picture information, radiofrequency transmittable information including Bluetooth or NFC, provided on said token, wherein the device can be coupled to or supplemented with an input device for user identification input including pin information, or with a token contacting unit.

* * * * *